June 10, 1958  R. T. HOWELL  2,837,942
SELF LOCKING BUSHING
Filed June 6, 1955
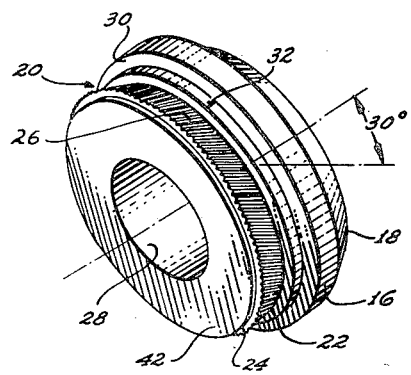
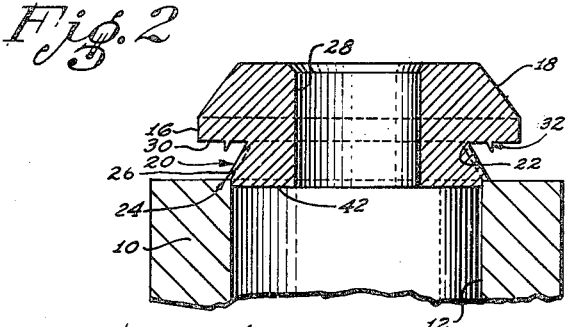
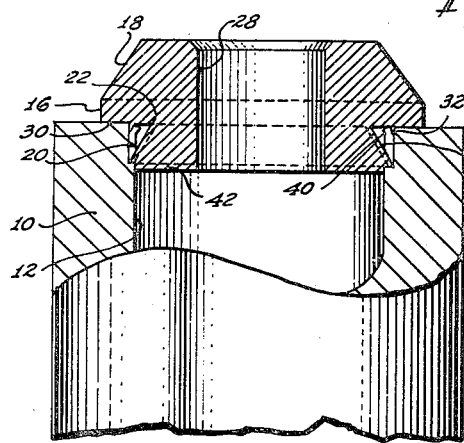
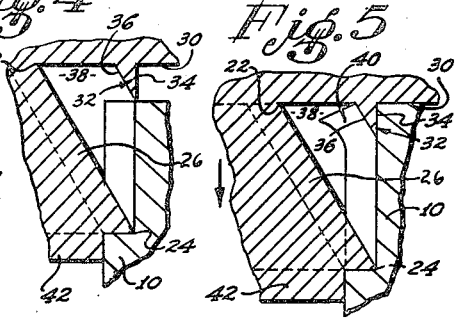
INVENTOR:
Ronald T. Howell
His Patent Attorney United States Patent Office 2,837,942
Patented June 10, 1958

2,837,942
SELF LOCKING BUSHING

Ronald T. Howell, Manhattan Beach, Calif., assignor to Northrop Aircraft, Inc., Hawthorne, Calif., a corporation of California Application June 6, 1955, Serial No. 513,190

2 Claims. (Cl. 77—62)

This invention has to do with self locking bushings and the like and with the means and method of installing bushings into a supporting member.

The principal object of this invention is to provide a self locking bushing that may be installed in a supporting member and prevented from ready removal therefrom.

Another object of this invention is to provide a self locking bushing that may be installed in a supporting member the former having structure thereon that shears the wall defining the bore in the supporting member to provide conditions wherein the bushing is in a non-rotating condition and is urged into a more firm locking condition if a rotating condition is applied thereto.

A yet further object of this invention is to provide a self locking bushing that may be installed in a supporting member having structure thereon that swages the wall of the supporting member defining the bore therethrough in such a manner as to prevent the ready removal therefrom of the bushing.

A yet further object of this invention is to provide a self locking bushing, that is readily fabricated, economical to manufacture and is suitable for mass production techniques.

Figure 1 is a perspective view illustrating and having embodied therein the present invention.

Figure 2 is a fragmentary cross-sectional view illustrating the first step of installing the present invention in a supporting member.

Figure 3 is a view similar to Figure 2, but illustrating the present invention in the fully installed position.

Figure 4 is an enlarged cross-sectional view illustrating the swaging ring on the present invention prior to penetrating the wall, defining the bore in the supporting member.

Figure 5 is a view similar to Figure 4 but illustrating the swaging ring in the fully penetrated condition in the supporting member and showing the manner of displacing material from the supporting member into a pocket provided.

Referring to the drawings for a more detailed description of the present invention 10 designates a supporting member, having any thickness, through which is a bore 12.

The bushing per se is generally cylindrical and is provided with a head 16, that is beveled as indicated by 18.

A frusto-conical portion 20 extends from the head 16 with the apex 22 of the portion being integral therewith. The base 24 is spaced from the head 16 and has an outside diameter larger than the bore 12. Further the exterior side of the portion 20 between the apex 22 and the base 24 has formed therein a multiplicity of serrations 26. It may be determined by referring to Figure 1 that the serrations are inclined in two directions with respect to the opening 28 through the bushing. Figure 1 indicates that one angle of inclination is 30° with respect to the opening 28. However, this angle is given only as an example and is not to be considered a limitation.

The apex 22 as well as the base 24 has an outside diameter that is less than that of the head 16. As a result a shoulder 30 is provided that engages the wall of the supporting member 10 that defines the bore 12.

Integral with the shoulder, spaced from the periphery of the head 16 and the portion 20 is tapered projection or swage ring 32. The exterior side 34 of the ring 32 is parallel to the opening 28. The interior side 36 is parallel to the exterior side of the portion 20. As a result of the spacing of the ring 32 with respect to the head 16 and portion 20 there is provided a pocket 38 that receives the swaged material 40 from the base member 10.

Provided on the base 24 of the portion 20 is a bore guide 42 that has an outside diameter substantially equal to that of the bore 12.

The operation of the device is as follows: The guide 42 is inserted into the bore 12 of the supporting member 10 in the manner illustrated in Figure 2 of the drawings. Force is then applied to the head 16 to urge the frusto-conical portion 20 into the bore. As a result of the force the serrations on the portion 20 shear material from the wall defining the bore 12. At the same time the wall is serrated leaving lands which subsequently become swaged material 40 when the swage ring 32 penetrates the supporting member 10 as may be determined by referring to Figures 3 and 5 of the drawings.

The swage material 40 enters into pocket 38 and if an attempt is made to withdraw the bushing from the supporting member 10 the material 40 resists the effort.

Due to the inclination of the serrations 26 there is a tendency for the bushing to thread into the bore 12.

As a result, if a rotary drill were inserted through the bushing, the rotation thereof would tend to thread the latter more firmly into the bore 12. Therefore, it may be seen that the serrations have as one function of their purpose to resist rotation in the bore 12.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A self locking bushing comprising a head; a frusto-conical extension on said head and having an outside dimension greater than the bore but less than said head resulting in there being a shoulder on said head that engages the wall defining the bore of the supporting member; serrations formed in the side of said extension resulting in there being a shearing edge that shears and serrates the wall defining the bore in order to lock said bushing in a non-rotating condition; said serrations being inclined in two directions with respect to the opening through said bushing; and a tapered projection on said shoulder that is spaced from said extension and penetrates the wall defining the bore of said supporting member resulting in swaging material of said supporting member into the space between said extension and said projection to lock and prevent the ready removal of said bushing from the assembled position.

2. A self-locking bushing comprising a head; a frusto-conical extension on said head having an outside dimension greater than the bore but less than said head resulting in there being a shoulder on said head that engages the wall defining the bore of the supporting member; serrations formed in the sides of said extension resulting in there being a shearing edge that shears and serrates the wall defining the bore in order to lock said bushing in a non-rotating condition; said serrations being inclined in two directions with respect to the opening through said bushing; and a tapered projection on said shoulder that is spaced from said extension and penetrates the wall defining the bore of said supporting member resulting in swaging material of said supporting member into the space between said extension and said projection to lock and prevent the ready removal of said bushing from the assembled position; said tapered projection having one side that is parallel to the opening through said bushing and another side that is parallel to the frusto-conical extension.

References Cited in the file of this patent

UNITED STATES PATENTS

| | | |
|---|---|---|
| 2,017,154 | Larkin | Oct. 15, 1935 |
| 2,255,964 | Blaho | Sept. 16, 1941 |

FOREIGN PATENTS

| | | |
|---|---|---|
| 145,979 | Australia | Apr. 3, 1952 |